United States Patent [19]
Kitt

[11] Patent Number: 6,116,190
[45] Date of Patent: Sep. 12, 2000

[54] HEAT LAMP FOR A FARROWING PEN

[76] Inventor: Lonnie J. Kitt, 510 Sandy Shores, Schuyler, Nebr. 68661

[21] Appl. No.: 09/364,319

[22] Filed: Jul. 30, 1999

[51] Int. Cl.[7] ...................................................... A01K 1/02
[52] U.S. Cl. ............................................................. 119/503
[58] Field of Search .................................. 119/502, 503, 119/508

[56] References Cited

U.S. PATENT DOCUMENTS

| | | |
|---|---|---|
| D. 348,953 | 7/1994 | Shwisha . |
| 2,280,779 | 4/1942 | Barragy . |
| 2,878,361 | 3/1959 | Steber . |
| 3,028,097 | 4/1962 | Johnson ................................... 119/508 |
| 3,139,881 | 7/1964 | Fannon, Jr. . |
| 3,472,206 | 10/1969 | Hegland et al. .......................... 119/503 |
| 3,824,959 | 7/1974 | Naig ......................................... 119/508 |
| 3,897,752 | 8/1975 | Greene . |
| 4,495,892 | 1/1985 | Jodar et al. . |
| 4,888,468 | 12/1989 | Maendel . |
| 5,060,629 | 10/1991 | Sirand . |
| 5,510,970 | 4/1996 | Hollenbach et al. . |
| 5,622,138 | 4/1997 | Underhill ................................. 119/508 |

FOREIGN PATENT DOCUMENTS

| | | | |
|---|---|---|---|
| 68716 | 1/1983 | European Pat. Off. ............... | 119/503 |
| 378206 | 4/1973 | U.S.S.R. ................................ | 119/503 |
| 860018 | 8/1981 | U.S.S.R. ................................ | 119/508 |

OTHER PUBLICATIONS

"Reproductive Loss Jeopardizes Income", Pork Health Tech, date unknown.

*Primary Examiner*—Thomas Price
*Attorney, Agent, or Firm*—Zarley, McKee, Thomte Voorhees & Sease; Dennis L. Thomte

[57] ABSTRACT

A heat lamp for a pig farrowing crate comprising an elongated housing having an elongated halogen bulb disposed therein at the upper end thereof with the longitudinal axis of the bulb being parallel to the longitudinal axis of the divider panel upon which the housing is mounted. An elongated, inverted channel is provided at the lower end of the housing for receiving the upper end of the divider panel. Heat from the halogen bulb is directed downwardly through the open lower end of the housing into creep areas at opposite sides of the divider panel.

23 Claims, 3 Drawing Sheets

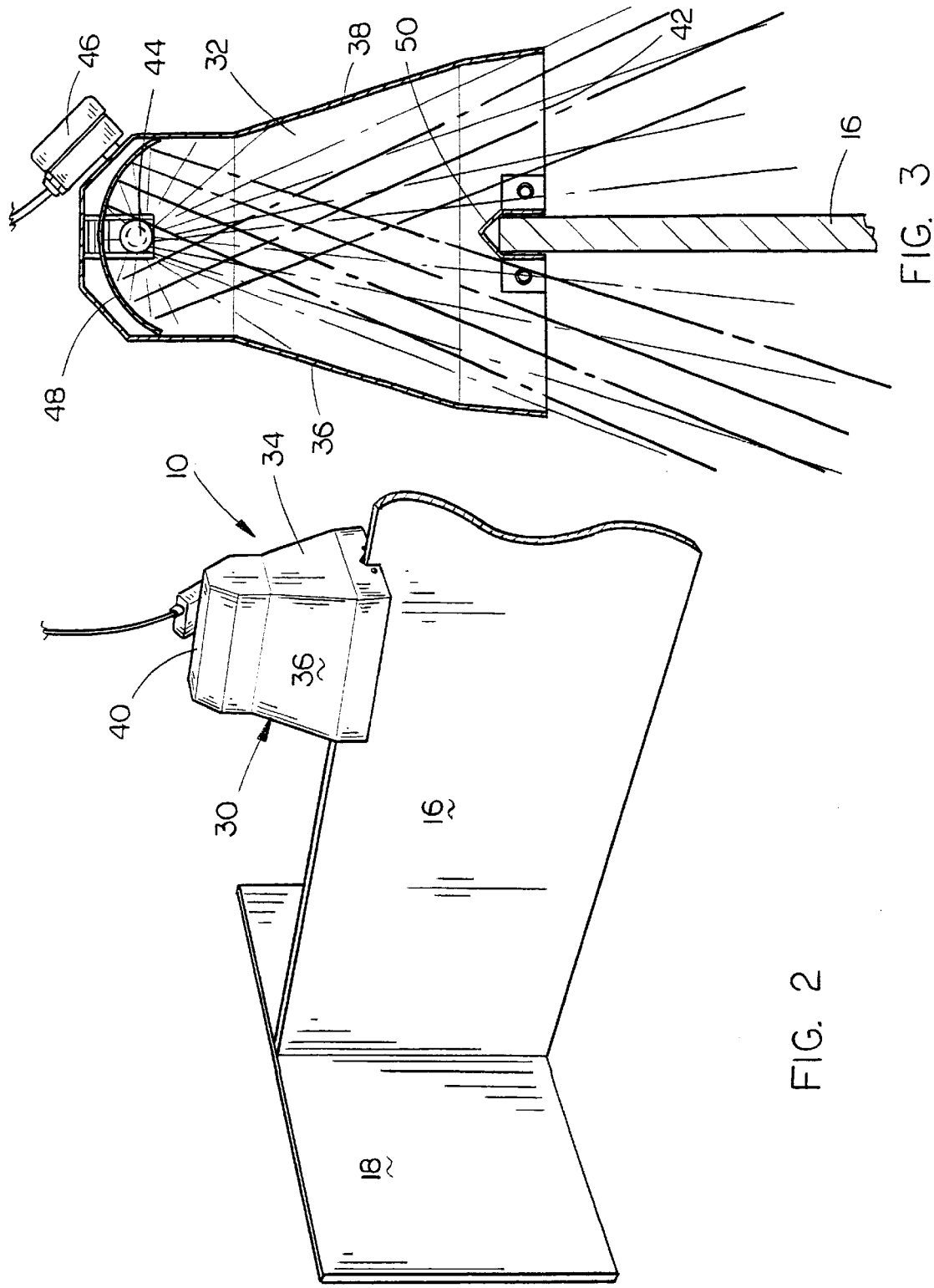

HEAT LAMP FOR A FARROWING PEN

BACKGROUND OF THE INVENTION

1. Field of the Invention

This invention relates to a heat lamp for a farrowing pen and more particularly to a single halogen heat lamp which can heat two separate litter pen areas.

2. Description of the Related Art

Farrowing crates have long been used in the pig farrowing industry. Generally speaking, a farrowing crate consists of a sow pen or crate having a creep area for the small pigs at one or both sides of the sow pen or crate. In many farrowing operations, the farrowing crates are arranged in a side-by-side arrangement with a vertically disposed divider panel being positioned between individual crates so that the pigs from one crate cannot move into the adjacent crate.

In most farrowing operations, it is desirable to heat the creep areas and the most common method has been to suspend a heat lamp over each of the creep areas. The need for a separate heat lamp for each creep area increases the cost of the installation. It is not normally possible to utilize a single heat lamp positioned directly about the divider panel because of the danger of melting the divider panel if the lamp is positioned low enough to effectively warm the creep areas.

SUMMARY OF THE INVENTION

A heat lamp is provided for use in providing heat to creep areas at opposite sides of an upstanding divider panel. The heat lamp comprises an elongated metal housing which has an open lower end and a closed upper end with spaced-apart end walls and side walls. An elongated halogen bulb is positioned in the upper end of the housing and is substantially horizontally disposed. A curved reflector is positioned above the halogen lamp for reflecting heat from the lamp downwardly through the lower open end of the housing. The lower end of the housing has an inverted metal channel member mounted thereon with the channel member receiving the upper end of the divider panel. The channel member not only aids in positioning the housing with respect to the divider panel, but also shields the upper end of the divider panel from the heat being created by the heat lamp.

It is therefore a principal object of the invention to provide an improved heat lamp for use in connection with a farrowing crate.

A further object of the invention is to provide a heat lamp which is supported on the upper end of a divider panel separating first and second creep areas so that the heat lamp will direct heat to both of the creep areas.

Still another object of the invention is to provide a heat lamp for use with farrowing crates including divider panels which prevents the heat lamp from damaging the divider panel.

A further object of the invention is to provide a device of the type described which provides improved heat distribution for a more uniform distribution below the lamp.

Yet another object of the invention is to provide a device of the type described which uses less energy to heat two creep areas than if two heat lamps are used to heat two creep areas.

Still another object of the invention is to provide a device of the type described which heats only an areas of approximately 1'×4' on either side of the creep divider which keeps excess heat from the sow.

Still another object of the invention is to provide a device of the type described above which is economical of manufacture and durable in use.

These and other objects of the invention will be apparent to those skilled in the art.

BRIEF DESCRIPTION OF THE DRAWINGS

FIG. 2 is a partial perspective view illustrating the heat lamp of this invention supported upon an upstanding divider panel;

FIG. 3 is a vertical sectional view through the heat lamp of this invention.

DESCRIPTION OF THE PREFERRED EMBODIMENT

Figure 1:
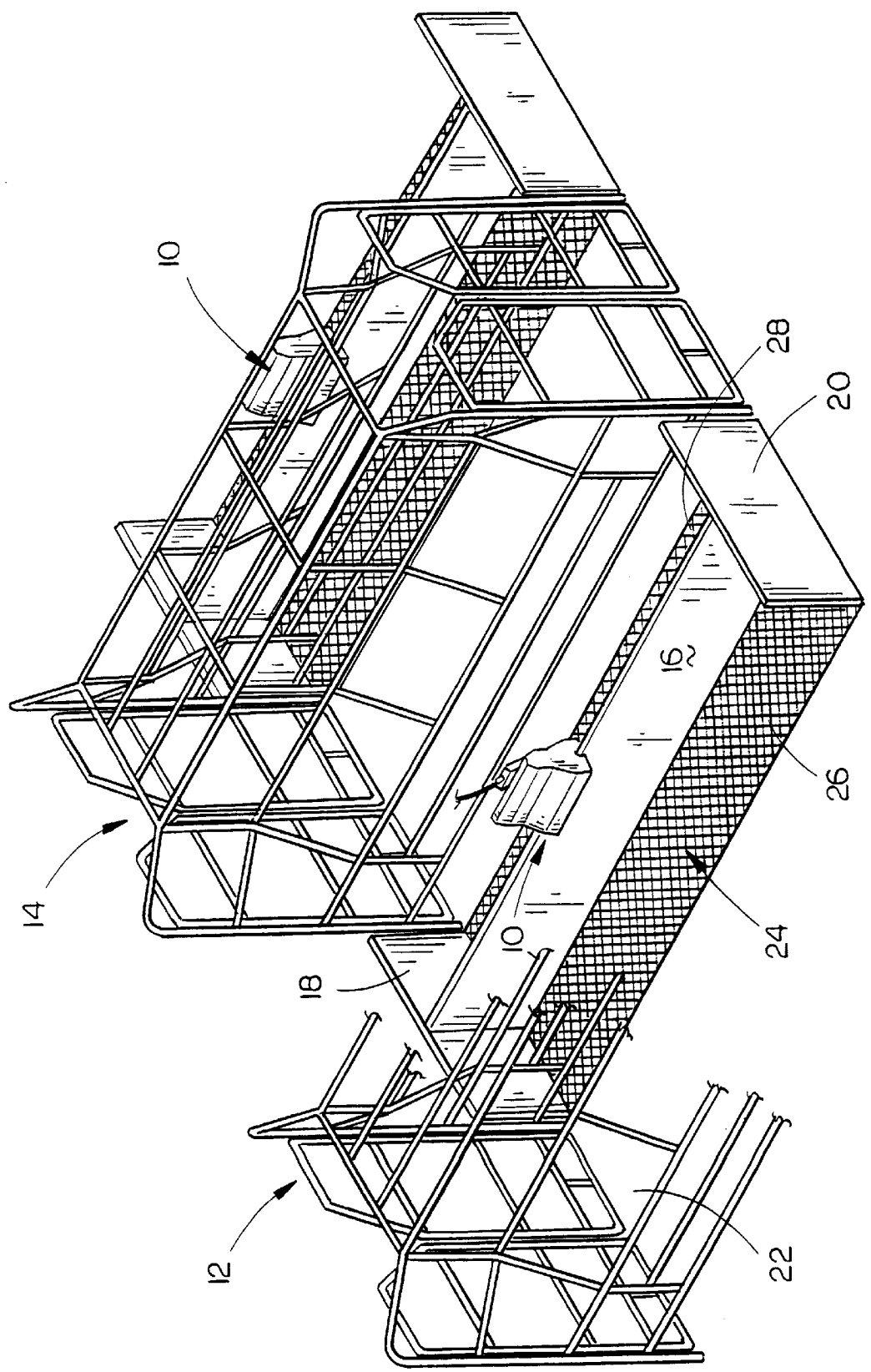
FIG. 1 is a partial perspective view illustrating the heat lamp of this invention being supported on a divider panel positioned between a pair of farrowing crates.
Figure 4:
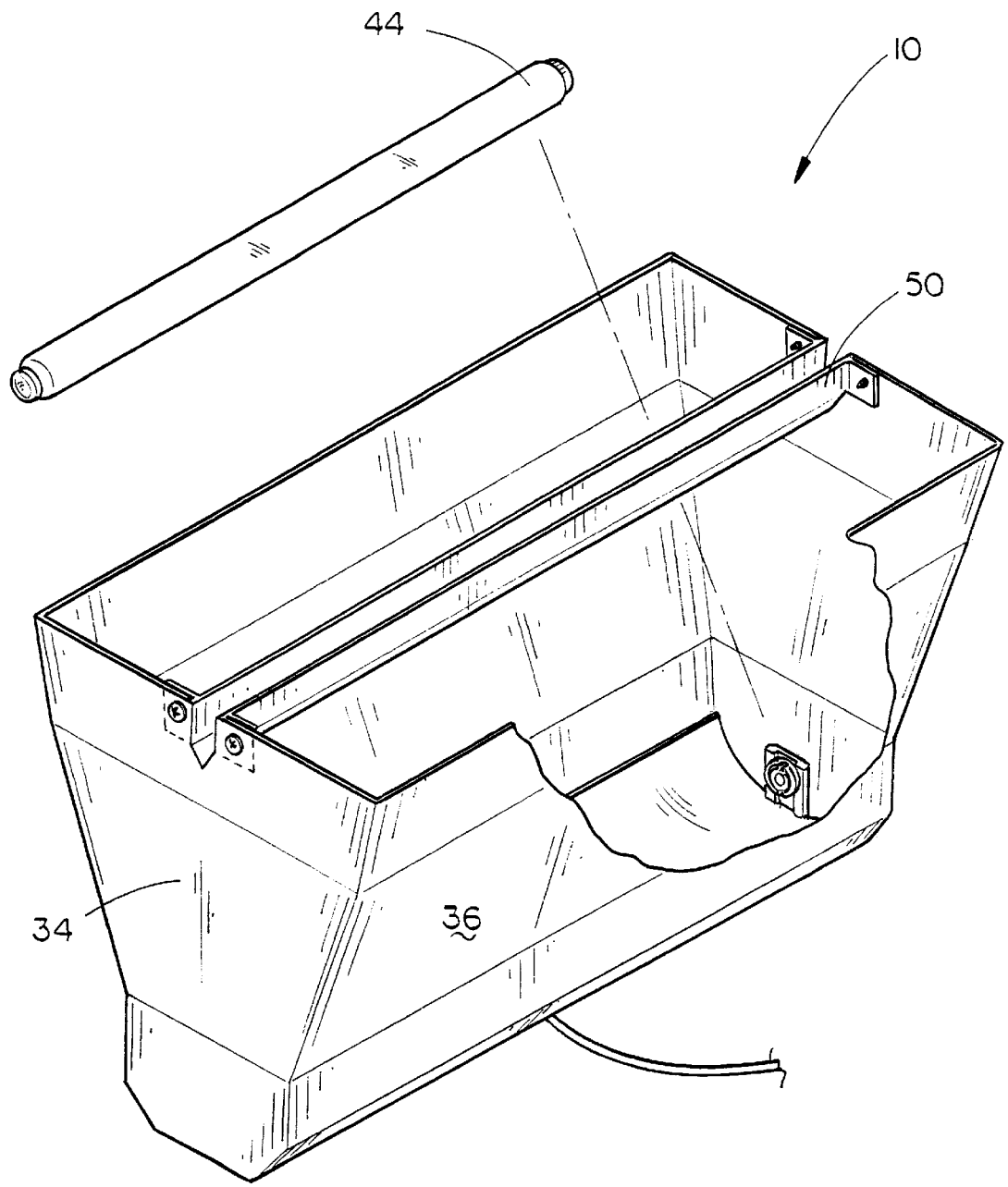
FIG. 4 is a bottom perspective view of the heat lamp of this invention with portions thereof cut away to more fully illustrate the invention.

The heat lamp of this invention is referred to generally by the reference numeral 10. The numerals 12 and 14 refer to a pair of farrowing crates which are positioned in a side-by-side relationship and which are separated by an upstanding divider panel 16 having transverse end sections 18 and 20. Each of the farrowing crates 12 and 14 are conventional in design. Farrowing crate 12 generally includes a sow pen or crate 22 having a grated creep area 24 at each side thereof. In some installations, a creep area is only provided at one side of the sow pen 22. As seen in FIG. 1, the divider panel 16 and the end walls 18 and 20 divide the creep area 24 into creep areas 26 and 28 to prevent the pigs from one farrowing crate moving into the adjacent farrowing crate.

In the past, the creep areas 26 and 28 each had a heat lamp suspended thereabove which increases the cost of the installation with the two heat lamps consuming considerable electrical energy. It is believed that the heat lamp 10 of this invention truly represents a significant advance in the art, as will be described hereinafter.

Heat lamp 10 includes a housing 30 which includes end walls 32 and 34, side walls 36 and 38 and a top wall 40. The housing 30 has an open lower end 42, as best seen in FIG. 3. As also best seen in FIG. 3, the side walls 36 and 38 are tapered so that the lower end of the housing 30 has a greater width than the upper end thereof.

The numeral 44 refers to an elongated halogen bulb (preferably 250 watts) which is controlled by a three-way switch 46 to provide precise comfort control for the pigs and which reduces energy consumption to less than 63 watts per side during warmer weather. An arcuate metal reflector 48 is positioned in the housing 30 above the lamp 44 to direct heat downwardly, as indicated in FIG. 3.

In those installations where the housing 30 is going to be directly supported on the upper end of the divider panel 16, which is the preferred embodiment, an inverted channel member 50 is provided which is adapted to receive the upper end of the divider panel 16, as illustrated in FIG. 3, so that the housing 30 is clamped onto the upper end of the divider panel 16. The channel member 50 also performs an important shielding function to shield the upper end of the divider panel 16 from the heat of the lamp so that damage to the divider panel 16 is prevented.

In some installations, it may be desirable to support the housing 30 above the divider panel by means of chains or bungee cords. Although it is preferred that the heat lamp of this invention be used to heat creep areas on opposite sides of the divider panel 16, there may be certain instances where the heat lamp could be used to heat a single creep area.

In operation, the housing 30 is mounted on the upper end of the divider panel 16, as illustrated in FIGS. 2 and 3. The three-way switch 46 is operatively connected to a source of electrical energy and is used to control the intensity of the bulb 44. When the bulb 44 is energized, heat from the bulb 44 is directed downwardly through the lower open end of the housing 30 so that heat is directed to the creep areas on each side of the divider panel. The design of the bulb 44 and the housing 30 is such that an area of approximately one foot by four foot is heated at either side of the divider panel 16 which keeps excess heat from the sow, since the average creep area is sixteen inches to seventeen inches wide. Further, the bulb 44 results in a more uniform heat distribution than do the traditional heat lamps. The use of a single bulb 44 to heat two creep areas requires less energy than two traditional heat lamps. By being able to utilize a single heat lamp for a pair of creep areas, the cost of the farrowing pen installation can be greatly reduced due to the elimination of the heat lamps normally used to heat individual creep areas. The metal construction of the housing 30 ensures that the housing will have a long and durable life and will be safe to use.

Thus it can be seen that the heat lamp of this invention accomplishes at least all of its stated objectives.

I claim:

1. In combination:
   a first pig farrowing crate including a generally rectangular first sow pen having first and second ends and first and second sides with a creep area at said second side of said first sow pen;
   a second pig farrowing crate including a generally rectangular second sow pen having first and second ends and first and second sides with a creep area at said first side of said second sow pen;
   said second side of said first sow pen being adjacent to said first side of said second sow pen;
   an upstanding divider panel positioned between said second side of said first sow pen and said first side of said second sow pen;
   a heat lamp positioned above said divider panel; and
   a heat shield positioned between said heat lamp and said divider panel;
   said heat lamp directing heat downwardly into both of said creep areas.

2. The combination of claim 1 wherein said heat lamp is enclosed within a lamp housing which is positioned at the upper end of said divider panel.

3. The combination of claim 2 wherein said divider panel is elongated and wherein said lamp housing is elongated and parallel to the length of said divider panel.

4. The combination of claim 3 wherein said heat lamp comprises an elongated bulb which is parallel to the length of said divider panel.

5. The combination of claim 4 wherein said elongated bulb is positioned directly above the upper end of said divider panel.

6. The combination of claim 5 wherein said lamp housing is mounted on and supported by said divider panel.

7. The combination of claim 2 wherein said lamp housing is mounted on and supported by said divider panel.

8. The combination of claim 2 wherein said lamp housing includes upstanding first and second end walls, upstanding first and second side walls, a top wall extending between the upper ends of said first and second side walls, and an open lower end.

9. The combination of claim 8 wherein said heat lamp is elongated and is horizontally disposed below said top wall.

10. The combination of claim 9 wherein said shield comprising an inverted channel member extending between said first and second end walls at the lower ends thereof, said inverted channel member receiving the upper end of said divider panel.

11. The combination of claim 8 wherein said heat lamp is elongated and is horizontally disposed below said top wall.

12. The combination of claim 8 wherein a reflector is positioned in said housing above said heat lamp.

13. The combination of claim 12 wherein said reflector extends between said first and second end walls.

14. The combination of claim 13 wherein said reflector is generally semi-circular in cross-section.

15. The combination of claim 1 wherein said heat lamp comprises a halogen bulb.

16. The combination of claim 15 wherein said halogen bulb is elongated and is horizontally disposed above said divider panel.

17. In combination:
   a pig farrowing crate means having a creep area;
   an upstanding divider panel dividing said creep area into first and second creep areas;
   an elongated lamp housing positioned above the upper end of said divider panel;
   an elongated heat lamp positioned in said lamp housing above the upper end of said divider panel; and
   a heat shield positioned between said elongated heat lamp and the upper end of said divider panel;
   said lamp housing directing heat from said heat lamp downwardly into both of said first and second creep areas.

18. The combination of claim 17 wherein said lamp housing is supported upon the upper end of said divider panel.

19. In combination with a pig farrowing crate means having a creep area which is divided into first and second creep areas by an upstanding divider panel, comprising:
   a lamp housing positioned above the upper end of the divider panel;
   a heat lamp positioned in said lamp housing above the upper end of the divider panel;
   said lamp housing directing heat from said heat lamp downwardly into both of the said first and second creep areas.

20. The combination of claim 19 wherein said lamp housing is rectangular.

21. The combination of claim 19 wherein said lamp housing is supported upon the upper end of the divider panel.

22. The combination of claim 21 wherein said lamp housing includes means for shielding the upper end of the divider panel from the heat from said heat lamp.

23. In combination:
   a first pig farrowing crate including a generally rectangular first sow pen having first and second ends and first and second sides with a creep area at said second side of said first sow pen;
   a second pig farrowing crate including a generally rectangular second sow pen having first and second ends and first and second sides with a creep area at said first side of said second sow pen;

said second side of said first sow pen being adjacent to said first side of said second sow pen;

an upstanding divider panel positioned between said second side of said first sow pen and said first side of said second sow pen;

a heat lamp positioned above said divider panel;

said heat lamp directing heat downwardly into both of said creep areas;

said heat lamp being enclosed within a lamp housing which is positioned at the upper end of said divider panel;

said lamp housing including upstanding first and second end walls, upstanding first and second side walls, a top wall extending between the upper ends of said first and second side walls, and an open lower end;

said heat lamp being elongated and being horizontally disposed below said top wall; and an inverted channel member extending between said first and second end walls at the lower ends thereof, said inverted channel member receiving the upper end of said divider panel.

* * * * *